April 13, 1937.   E. J. PILBLAD ET AL   2,076,825
LOCKING DEVICE
Filed Aug. 29, 1933
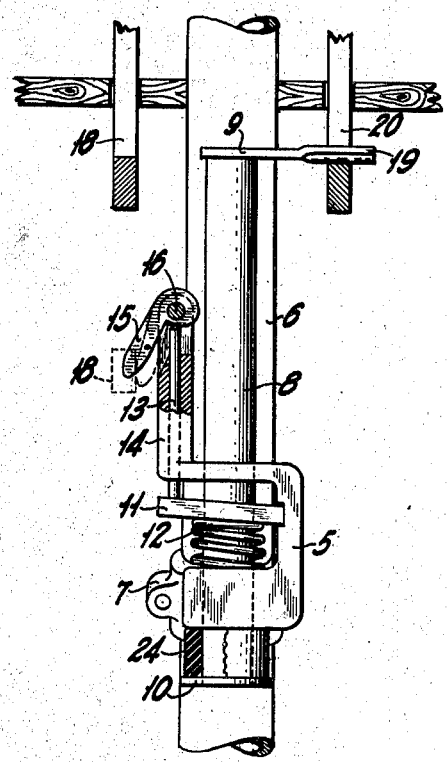
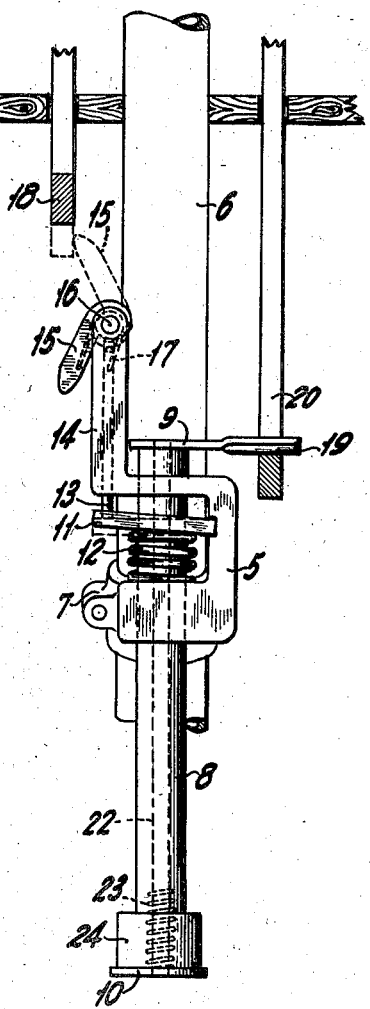
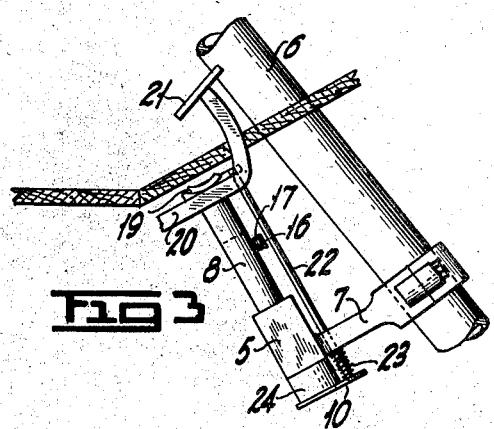
INVENTOR.
Eric J. Pilblad. and
BY Charles C. Strange.
ATTORNEY Patented Apr. 13, 1937

2,076,825

UNITED STATES PATENT OFFICE 2,076,825

LOCKING DEVICE

Eric J. Pilblad, Rockville Centre, and Charles C. Strange, Port Richmond, Staten Island, N. Y.

Application August 29, 1933, Serial No. 687,326

29 Claims. (Cl. 192—13)

This invention relates to locking means and more particularly to a device for holding the foot pedals of an automotive vehicle, or the like, in a given position.

One of the objects of the present invention is to provide novel means for controlling the locking and releasing of the brake mechanism of an automotive vehicle.

Another object is to provide novel apparatus whereby the brake pedal of a vehicle may be subjected to control by the clutch pedal thereof without in any way interfering with the freedom of operation of the latter.

A further object is to provide a novel method of operating a motor vehicle wherein the brakes are released by operation of the clutch pedal at the time of engagement of the clutch mechanism of the vehicle.

The above and further objects and novel features of this invention will appear more fully from the following detailed description when taken in connection with the accompanying drawing. It is to be expressly understood, however, that the drawing is for the purpose of illustration only and is not designed as a definition of the limits of the invention, reference being primarily had for this purpose to the appended claims.

In the drawing wherein like reference characters refer to like parts throughout the several views:

Fig. 1 is a bottom view partly in section and with parts broken away of a device embodying the present invention as seen when viewed along a line normal to the steering column of the vehicle upon which the same is mounted;

Fig. 2 is a similar view illustrating the device in operative position; and,

Fig. 3 is a diagrammatic side elevation of the device installed on a vehicle.

Only one embodiment of the present invention is illustrated which, by way of example, is shown installed on an automotive vehicle in association with the clutch and brake pedals thereof in a position such that the operation of the brake mechanism may be controlled in a novel and efficient manner by the actuation of the clutch pedal.

In the form shown, the device comprises a U-shaped frame member 5 adapted to be stationarily suspended from the steering column 6 of a vehicle by means of a bracket 7 (Fig. 3) formed integrally with said frame. The leg portions of member 5 are provided with aligned openings adapted to slidably receive a rod 8 preferably of circular cross section and having a diameter slightly less than the diameter of said openings. Suitable means such as plates 9 and 10 are secured to the opposite ends of rod 8 to prevent the removal of the same from member 5.

Means are provided for temporarily locking rod 8 against movement in one direction along the line of its longitudinal axis. Such means, as shown, are constituted by a comparatively thin locking member 11, one edge of which is adapted to extend into a groove in the base of frame 5, said groove being somewhat wider than the thickness of member 11 thus permitting a limited pivotal movement of the latter. Rod 8 extends through an opening in the center portion of locking member 11, said opening having a somewhat greater diameter than the rod. A spring 12 surrounding rod 8 and interposed between one leg of frame 5 and the face of the locking member 11 is adapted to normally hold the latter in an inclined position, preferably about 5 degrees from the normal to the longitudinal axis of rod 8, the degree of inclination being determined by the difference in the diameters of said rod and the opening in member 11.

With member 11 in its normal inclined position relative to rod 8 the walls of the opening in said member are effective to grip the sides of the rod and to lock the same against movement in the direction of such inclination. When, however, member 11 is moved against the pressure of spring 12 to a position such that the faces thereof are normal to the axis of rod 8, the latter will be free to move in either direction.

In the illustrated embodiment the device is so mounted that when member 11 is in unlocking position, rod 8 is free to fall by the force of gravity until plate 9 engages the upper leg of frame 5 and is arrested by other means to be hereinafter pointed out.

Novel means are provided for controlling the position of member 11 and hence the movement of rod 8, such means, as shown, comprising a pin 13 loosely mounted in a longitudinal opening bored in an arm 14 formed integrally with and extending at right angles from the upper leg of frame 5. The lower end of pin 13 rests upon the upper face of member 11 near the outer edge thereof and is adapted to be engaged at its upper end by the hub portion of a cam finger 15 which is pivotally mounted on a pivot 16 in the upper bifurcated end of arm 14. Finger 15 projects outwardly from arm 14 and is adapted to be engaged by the arm 18 of the clutch pedal (not shown), said finger being normally held in the path of the latter by a spring 17 coiled about a projecting portion of pivot pin 16 (Fig. 3) and having its opposite ends secured to finger 15 and arm 14.

The hub portion of member 15 is formed in the shape of a cam which is adapted to engage the upper end of pin 13 to move the latter downwardly when the outer end of said member is moved upwardly by the upward movement of the clutch pedal arm 18. The cam is so constructed that the downward movement of member 15 from normal position is not effective to transmit any motion to pin 13 nor to member 11.

Plate 9 on the upper end of rod 8 is provided with a laterally extending portion 19 which is adapted to engage the upper surface of the brake pedal arm 20, and, when the brake pedal 21 is in its lowered brake applying position, rod 8 may be released and permitted to fall by force of gravity until portion 19 engages arm 20. It will thus be seen that the brakes may be held in applied position through the locking action of member 11. When rod 8 is then released by again moving member 11 to a position normal to the rod the usual retracting spring (not shown) employed on the brake pedal will return the latter and rod 8 to raised position thereby releasing the brakes.

The locking and releasing of rod 8 are controlled as pointed out above by clutch pedal arm 18 acting through pawl 15. Preferably, the device is so constructed that arm 18 in its upward travel will engage pawl 15 and hence unlock rod 8 at approximately the same instant that the clutch mechanism of the vehicle engages. Thus the brakes are automatically released at the same time that a driving engagement is established, the driver being free to employ his right foot on the accelerator pedal.

Suitable means are provided for preventing rotation of rod 8 so that portion 19 thereof will be held at all times in a position to engage brake arm 20, such means as shown comprising a small rod 22 (Fig. 3) which is secured at its opposite ends to projections on plates 9 and 10 and extends through an opening in bracket 7. A light spring 23 may be provided on the lower end of rod 22 of sufficient length to be compressed between bracket 7 and plate 10 when rod 8 is in raised position. Spring 23 is thus effective to initiate the gravitational movement of rod 8 when the same is unlocked and the brakes are applied.

If desired, suitable cushioning means such as rubber cushion 24 may be provided around the lower end of rod 8 for eliminating any shock which might otherwise be caused when the brake pedal moves out automatically without any resisting force being applied to the same.

In operating a vehicle upon which the illustrated device is installed, the same is stopped in the usual manner by depressing both the clutch pedal and the brake pedal and thereafter moving the gear shift lever to neutral position. The clutch pedal is then released whereupon arm 18 in its upward travel engages cam finger 15 raising the same to the dotted line position shown in Fig. 2, thereby depressing pin 13 and moving member 11 to dotted line unlocking position. Rod 8 is thus released and is moved by force of gravity and spring 23 to the position shown in Fig. 2. Further upward movement of clutch arm 18 releases pawl or cam finger 15 which is then returned to its normal full line position by spring 17, thus permitting spring 12 to move member 11 to locking position to prevent upward movement of rod 8 and hence brake pedal 20, 21. The driver may now remove his foot from the brake pedal and the brakes of the vehicle will be held in applied position. It will thus be apparent that the driver will be relieved of holding either the clutch or brake pedal down when it is necessary to stop, for instance, on the side of a hill at a traffic signal, in heavy traffic, or for parking purposes.

When it is desired to start the vehicle again, the clutch pedal is depressed and the gears shifted in the usual manner, it being noted that the engagement of arm 18 on its downward movement with pawl 15 is not effective to move member 11 to unlock rod 8. As the clutch pedal is then released, arm 18 again engages the lower surface of pawl 15 just prior to the engagement of the vehicle clutch mechanism. Further movement of arm 18 raises pawl 15 to effect the unlocking of rod 8 whereupon the brakes are released through the action of the brake pedal retracting spring (not shown), rod 8 being returned to normal raised position together with arm 20 by means of said spring. A driving connection is thus established at substantially the same time as the brakes are released, thereby eliminating the usual difficulty of starting on a hill, the operative being free at the same time to employ his right foot on the accelerator pedal.

It is also pointed out that the clutch pedal may be employed for disengaging the clutch mechanism without depressing the brake pedal, the rod 8 being held in normal position by the engagement of projection 19 with arm 20. It will also be noted that the brakes may be employed at will without actuating the clutch pedal, the friction between rod 8 and member 11 when the latter is in normal full line position being sufficient to prevent the downward movement of rod 8 under gravitational forces.

There is thus provided a novel and useful locking device together with novel control means for the same, the device being particularly adapted for use in connection with the foot pedals of automotive vehicles, but which may be employed in various modifications which will be apparent to those skilled in the art with other types of machinery wherein it is desirable to control the operation of adjacent parts in a particular manner. There is also provided a novel method and means for controlling the operation of a motor vehicle whereby the brakes thereof may be locked in applied position and automatically released by actuation of the clutch pedal. It is to be expressly understood that the present invention is not limited to the single embodiment illustrated and that various changes may be made in the design and arrangement of parts shown without departing from the spirit of the invention. Reference will be had primarily to the appended claims for a definition of the limits of the invention.

What is claimed is:

1. In apparatus of the class described, a brake pedal, a clutch pedal, means for holding said brake pedal in depressed position, and means adapted to be engaged by the upper surface of the clutch pedal when the same is released to render said holding means operative to hold the brake pedal at depressed position and to release the holding means on a second actuation of the clutch pedal.

2. In apparatus of the class described, a brake pedal, a clutch pedal, means adapted to engage the brake pedal to hold the same in brake applying position, and cam means in the path of and adapted to be engaged by the clutch pedal for rendering said first-named means operative to hold the brake pedal.

3. In combination with the brake and clutch pedals of a motor vehicle, longitudinally movable means adapted to engage the brake pedal and to move independently thereof for holding the brake mechanism in applied position, and cam means adapted to be engaged by the clutch pedal for releasing the holding means.

4. In combination with the brake and clutch pedals of an automotive vehicle, a stationary supporting member, a movable element slidably supported by said member, a locking member adapted to lock said movable element against longitudinal movement, said element being mounted for movement independent of and adapted to engage the brake pedal to hold the vehicle brakes in applied position, means for normally holding said locking member in operative position, and cam means adapted to be engaged by said clutch pedal to hold said locking member in unlocking position.

5. In combination with the brake and clutch pedals of an automotive vehicle, a stationary frame, a holding member slidably supported by said frame and adapted to engage the brake pedal, a locking member pivoted in said frame, means for normally holding the latter in position to lock said holding member against longitudinal movement, and cam means mounted on the frame and adapted to be engaged by the clutch pedal for releasing said holding member.

6. The combination with a pair of pivotally mounted levers, of a locking device comprising a holding member for one of said levers slidably supported by a stationary frame, said member being adapted for movement independent of said last-named lever, means for normally locking said member in a given position against movement in one direction, and a pivoted cam member operatively associated with said locking means for rendering the latter inoperative when said cam member is actuated by the other of said levers.

7. In apparatus of the class described, a frame, a member movable by gravity slidably supported by said frame, a locking member pivotally mounted in said frame, means for holding said locking member in engagement with said movable member to lock the latter against movement in one direction, cam means for rendering said locking member inoperative, and resilient means for normally rendering said cam means inoperative to release said movable member.

8. In apparatus of the class described, a brake pedal, a clutch pedal, a stationary frame, a holding member slidably supported by said frame and adapted to engage the brake pedal, locking means for normally locking said holding member against longitudinal movement, and a cam member pivotally mounted on said frame and having the free end thereof in the path of the clutch pedal and adapted when moved in one direction to render the locking means inoperative.

9. In apparatus of the class described, a clutch pedal, a brake pedal, a movable member adapted to engage the upper surface of the brake pedal, locking means for holding said member against movement whereby said brake pedal may be held in depressed position, and means for controlling said locking means including a member pivotally mounted with the free end thereof in the path of the clutch pedal.

10. In combination with the brake and clutch pedals of a motor vehicle, a brake locking device comprising a supporting frame, a movable element slidably supported by said frame and engaging said brake pedal, means for locking said element against movement to hold the brake pedal in applied position, and means for releasing said element including a cam member operatively engaging said locking means and adapted to be momentarily engaged by the clutch pedal during the upward movement of the latter at a time when the clutch mechanism of the vehicle is engaging.

11. A locking device comprising a stationary frame member, an element movable by gravity slidably supported by said frame member, means for locking said movable element against longitudinal movement, and means including a spring controlled cam for releasing said locking means.

12. In combination with the brake and clutch mechanisms of a motor vehicle, means adapted to engage the brake mechanism to hold the brakes in applied position, and cam means adapted to be engaged by the clutch mechanism when the latter is moved toward engaged position for rendering said first named means operative to so hold the brakes.

13. The combination in a vehicle having a clutch mechanism, of a brake pedal, a clutch pedal, means including a longitudinally movable member for holding said brake pedal in brake applying position, said member being movable independently of said brake pedal, and means engageable by the clutch pedal upon the release of the same to release said holding means at substantially the time a driving connection is established by said clutch mechanism.

14. In apparatus of the class described, brake mechanism, clutch mechanism, means for holding said brake mechanism in applied position including a movable member adapted to engage said brake mechanism and holding means for said member, said last-named means being normally effective to hold said member in inoperative position, and means engageable by said clutch mechanism upon the engaging movement thereof for momentarily releasing said holding means.

15. In combination with the brake and clutch pedals of a motor vehicle, longitudinally movable means adapted to engage the brake pedal, friction holding means for said movable means whereby the brake mechanism is held in applied position, and cam means mounted for movement independent of the clutch pedal and adapted to be engaged thereby for releasing the holding means.

16. The combination with a motor vehicle and its brake and clutch mechanisms of a locking device comprising a supporting frame adapted to be rigidly attached to the vehicle, a rod slidably supported by said frame for movement independent of the brake mechanism, means on said rod for engaging the brake pedal of the vehicle, a locking member pivotally mounted on said supporting frame, said member having an opening therein for receiving said rod, means for normally holding said member in tilted relation to said rod to normally hold the latter against movement, and means including a cam member engageable by the clutch pedal of the vehicle for moving said locking member to inoperative position.

17. The combination with the brake and clutch mechanisms of a motor vehicle, of a brake locking device comprising a supporting frame stationarily mounted on said vehicle, a movable member slidably supported by said frame, a portion of said member being adapted to engage the brake pedal, cushioning means interposed between the lower end of said member and said frame, means for holding said member against movement relative to the frame, and means including a cam adapted to be actuated by the clutch operating system of the vehicle for releasing said holding means.

18. The combination with the brake and clutch mechanisms of a vehicle, of a locking device comprising supporting means, a movable member adapted to engage the brake pedal, said member being slidably mounted on said supporting means for movement independent of the brake pedal, locking means for said member mounted on said supporting means for normally holding said movable member against movement relative to said supporting means, and cam means engageable by the clutch pedal for controlling said locking means.

19. In apparatus of the class described, the combination with a brake pedal and a clutch pedal, of a supporting member, a movable member carried by the supporting member for engagement with the brake pedal whereby the latter may be held in brake applying position, said member being movable independently of the brake pedal, locking means for said movable member, and releasing means adapted to actuate said locking means, said releasing means being actuated by the clutch pedal on upward movement of the latter whereby the timing of the release of the clutch pedal with respect to manual release of the brake pedal automatically locks or releases the brake pedal in depressed position at the will of the operator.

20. In combination with a motor vehicle and the brake and clutch mechanisms thereof, a brake locking device of the character described comprising a fixed supporting element, a movable element slidably mounted on said fixed supporting element, means on the movable element to engage the brake pedal of the vehicle, means to lock the movable element to the fixed supporting element against any upward movement of the movable element, and cam means pivotally mounted on said supporting element and operatively associated with said locking means, said cam means being engageable by the clutch mechanism of the vehicle to release the locking action of said locking means.

21. In combination with the brake and clutch pedals of a vehicle, a brake locking device comprising a guide member rigidly mounted on the vehicle, a movable member slidably supported by said guide member, said movable member being adapted to engage the brake pedal, locking means including a pivoted member and resilient means for locking said movable member to said fixed member to hold said brake pedal in depressed position, and cam means pivotally mounted for movement independent of said clutch pedal and adapted to be actuated thereby for controlling said locking means.

22. In combination with the brake and clutch mechanisms of a vehicle, a brake locking unit including a fixed member and a movable member, the latter being mounted for movement independent of and having a portion adapted to engage the brake pedal, means for holding said movable member against gravitational movement in one direction and locking the same against movement in the opposite direction whereby said unit is adapted to hold the brake pedal in depressed position, and means including a member pivoted independently of said locking means for controlling the movement of said movable element through movement of the clutch pedal.

23. In combination with the brake and clutch mechanisms of a vehicle, a brake locking device comprising a fixed supporting element, a movable element slidably supported by said supporting element for movement independently of the brake mechanism, means for locking said movable element to said supporting element, said movable element being adapted to engage the brake actuating mechanism for holding the brakes in applied position, and cam means actuated by the clutch mechanism for releasing said locking means.

24. In apparatus of the class described, brake mechanism, clutch mechanism, means adapted to engage an element of said brake mechanism to hold the brakes in applied position, and cam means mounted for movement independent of the clutch mechanism and adapted to be engaged by an element thereof for rendering said first named means operative to hold the brakes in applied position.

25. In combination with the brake and clutch pedals of an automotive vehicle, a movable member engaging said brake pedal, holding means for said movable member including a stationary frame member and a locking member pivotally mounted on said frame member whereby the vehicle brakes may be held in applied position, and means pivotally mounted on said holding means with a free end thereof in the path of the clutch pedal and engageable thereby for releasing said holding means.

26. In combination with the brake and clutch pedals of a motor vehicle, longitudinally movable means engaging said brake pedal, friction holding means for said movable means whereby the brake mechanism of the vehicle is held in applied position, and means mounted for pivotal movement independent of the clutch pedal and adapted to be directly engaged by said clutch pedal for releasing said holding means.

27. In combination with the brake and clutch pedals of a motor vehicle, movable means adapted to engage the brake pedal, means for holding said movable means against movement in one direction to hold the brake mechanism in applied position, and means including a lever pivotally mounted with one end thereof in the path of the clutch pedal and engageable thereby for actuating the holding means.

28. In apparatus of the class described, a clutch mechanism, a brake mechanism, a movable member engaging the brake mechanism, locking means for holding said movable member whereby the brake mechanism may be held in brake applying position, and means for controlling said locking means including a member pivotally mounted with the free end thereof in the path of the clutch pedal.

29. In combination with the brake and clutch mechanisms of a motor vehicle, a brake holding device comprising a supporting frame, a movable element slidably received by said frame and engaging an element of said brake mechanism, means for holding said movable element against movement in one direction to hold the brake mechanism in applied position, and means for releasing said movable element including a pivotally mounted member operatively associated with said holding means, one end of said member being adapted to extend into the path of the clutch pedal and be momentarily engaged thereby during the engaging movement thereof.

CHARLES C. STRANGE.
ERIC J. PILBLAD.